US010332432B2

(12) United States Patent
An et al.

(10) Patent No.: US 10,332,432 B2
(45) Date of Patent: Jun. 25, 2019

(54) DISPLAY DEVICE

(71) Applicant: SAMSUNG DISPLAY CO., LTD., Yongin-si, Gyeonggi-do (KR)

(72) Inventors: Bo-Young An, Hwaseong-si (KR); Ji-Hye Shin, Cheonan-si (KR); Komiya Naoaki, Hwaseong-si (KR); Ho-Suk Maeng, Seoul (KR)

(73) Assignee: Samsung Display Co., Ltd., Yongin-Si, Gyeonggi-do (KR)

( * ) Notice: Subject to any disclaimer, the term of this patent is extended or adjusted under 35 U.S.C. 154(b) by 32 days.

(21) Appl. No.: 15/434,647

(22) Filed: Feb. 16, 2017

(65) Prior Publication Data

US 2017/0270841 A1 Sep. 21, 2017

(30) Foreign Application Priority Data

Mar. 16, 2016 (KR) ........................ 10-2016-0031208

(51) Int. Cl.

| | |
|---|---|
| ***G06F 3/01*** | (2006.01) |
| ***G09G 3/00*** | (2006.01) |
| ***G09G 3/20*** | (2006.01) |
| ***G09G 3/3266*** | (2016.01) |
| ***G09G 3/3275*** | (2016.01) |
| ***G09G 5/00*** | (2006.01) |

(52) U.S. Cl.

CPC ........... *G09G 3/001* (2013.01); *G09G 3/2018* (2013.01); *G09G 3/2092* (2013.01); *G09G 3/3266* (2013.01); *G09G 3/3275* (2013.01); *G09G 5/005* (2013.01); *G09G 3/003* (2013.01); *G09G 2310/0283* (2013.01); *G09G 2310/08* (2013.01); *G09G 2320/068* (2013.01); *G09G 2320/0626* (2013.01); *G09G 2320/0673* (2013.01); *G09G 2340/045* (2013.01); *G09G 2340/0464* (2013.01); *G09G 2354/00* (2013.01)

(58) Field of Classification Search

None

See application file for complete search history.

(56) References Cited

U.S. PATENT DOCUMENTS

2005/0253825 A1* 11/2005 Kawamura .............. G09G 3/22 345/204
2008/0111833 A1* 5/2008 Thorn ....................... G09G 5/00 345/690
2009/0303078 A1* 12/2009 Mochizuki ............ B60W 40/02 340/901
2016/0202484 A1* 7/2016 Ouderkirk ............ G02B 27/017 348/78

FOREIGN PATENT DOCUMENTS

| | | | |
|---|---|---|---|
| JP | 2003-345297 | A | 12/2003 |
| JP | 2008-158399 | A | 7/2008 |
| KR | 10-2009-0067457 | A | 6/2009 |
| KR | 10-2011-0055259 | A | 5/2011 |
| KR | 10-2015-0106031 | A | 9/2015 |

* cited by examiner

*Primary Examiner* — Joseph R Haley

(74) *Attorney, Agent, or Firm* — Lee & Morse, P.C.

(57) ABSTRACT

A display device includes a display panel, a timing controller, and a data driver. The display panel includes a central region and a peripheral region. The timing controller converts image data to converted data so that a maximum luminance of the peripheral region is less than a maximum luminance of the central region. The data driver generates a data signal based on the converted data and to provide the data signal to the display panel.

12 Claims, 12 Drawing Sheets

DISPLAY DEVICE

CROSS-REFERENCE TO RELATED APPLICATION

Korean Patent Application No. 10-2016-0031208, filed on Mar. 16, 2016, and entitled, "Display Device," is incorporated by reference herein in its entirety.

BACKGROUND

1. Field

One or more embodiments described herein relate to a display device.

2. Description of the Related Art

A head-mounted display device has been proposed for use in virtual reality gaming and other applications. However, existing head-mounted display devices have drawbacks relating to size, efficiency, and performance.

SUMMARY

In accordance with one or more embodiments, a display device includes a display panel including a central region and a peripheral region; a timing controller to convert image data to converted data so that a maximum luminance of the peripheral region is less than a maximum luminance of the central region; and a data driver to generate a data signal based on the converted data and to provide the data signal to the display panel.

The timing controller may calculate an on-pixel ratio of the image data, generate first sub converted data by reducing first sub image data among the image data based on the on-pixel ratio and a first reference on-pixel ratio, and generate second sub converted data by reducing second sub image data among the image data based on the on-pixel ratio and a second reference on-pixel ratio different from the first reference on-pixel ratio, wherein the first sub data corresponds to the central region, the second sub data corresponds to the peripheral region, and the converted data includes the first sub converted data and the second sub converted data.

The on-pixel ratio may be a ratio of a driving amount when pixels in the display panel are driven based on the image data to a driving amount when the pixels are driven with a maximum grayscale value. The central region may be determined based on a viewing angle of a user to the display panel.

The timing controller may include a first calculator to calculate the on-pixel ratio based on the image data; a second calculator to calculate a first scaling rate based on the on-pixel ratio and the first reference on-pixel ratio and to calculate a second scaling rate based on the on-pixel ratio and the second reference on-pixel ratio; and a image converter to generate the first sub converted data by reducing the first sub image data based on the first scaling rate and to generate the second sub converted data by reducing the second sub image data based on the second scaling rate.

The second calculator may calculate the first scaling rate based on Equation 1 when the on-pixel ratio is greater than the first reference on-pixel ratio:

$$ACL\_DY1=ACL\_\mathrm{OFF\_MAX1}\times(\mathrm{OPR}(N)-\mathrm{START\_OPR1})/(\mathrm{MAX\_OPR}-\mathrm{START\_OPR1}) \quad (1)$$

where ACL_DY1 denotes the first scaling rate, ACL_OFF_MAX1 denotes a first maximum scaling rate, OPR(N) denotes the on-pixel ratio, START_OPR1 denotes the first reference on-pixel ratio, and MAX_OPR denotes a maximum on-pixel ratio.

The second calculator may output the first scaling rate equal to a reference scaling rate when the on-pixel ratio is less than the first reference on-pixel ratio. The first reference on-pixel ratio may be equal to a maximum on-pixel ratio. The display panel may include a boundary region between the central region and the peripheral region, and the image converter may reduce boundary image data corresponding to the boundary region based on the first scaling rate and the second scaling rate.

The image converter may calculate a third scaling rate by interpolating the first scaling rate and the second scaling rate based on location information of a grayscale value in the boundary image data and is to reduce the grayscale value based on the third scaling rate. The image converter may calculate a fourth scaling rate by interpolating the first scaling rate and the second scaling rate based on location information of a grayscale value in the image data and reduces the grayscale value based on the fourth scaling rate.

The image converter may calculate an additional scaling rate based on direction information of a grayscale value in the image data and reduce the grayscale value based on the fourth scaling rate and the additional scaling rate, and the direction information includes a direction in which a pixel corresponding to the grayscale value is located with a central axis of the display panel. The timing controller may include a image processor to generate the image data by shifting an input image data from an external component in a first direction. The image processor may match a central axis of an image corresponding to the input image data to a central axis of the display panel.

In accordance with one or more other embodiments, a display device includes a display panel including a central region and a peripheral region; and a data driver to generate a first data signal based on first sub image data corresponding to the central region and to generate a second data signal based on second sub image data corresponding to the peripheral region, wherein a second maximum grayscale voltage of the second data signal is less than a first maximum grayscale voltage of the first data signal.

The data driver may include a first gamma register to store the first sub image data temporally; a first gamma block to generate the first data signal based on the first sub image data; a second gamma register to store the second sub image data temporally; and a second gamma block to generate the second data signal based on the second sub image data. The display device may include a scan driver to generate a scan signal and to sequentially provide the scan signal to the display panel, the second gamma block to operate when a time point at which the scan signal is provided to the central region.

In accordance with one or more other embodiments, a display device includes a first display panel including a central region and a peripheral region; a timing controller to generate image data by shifting input image data from an external component in a first direction and to generate converted data by converting the image data, so that a maximum luminance of the peripheral region is lower than a maximum luminance of the central region; and a data driver to generate a data signal based on the converted data and to provided the data signal to the display panel. The central region may be determined based on an area center of the first display panel. The timing controller may shift the input image data to locate a center of an image corresponding to the image data onto a viewing axis of a user.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
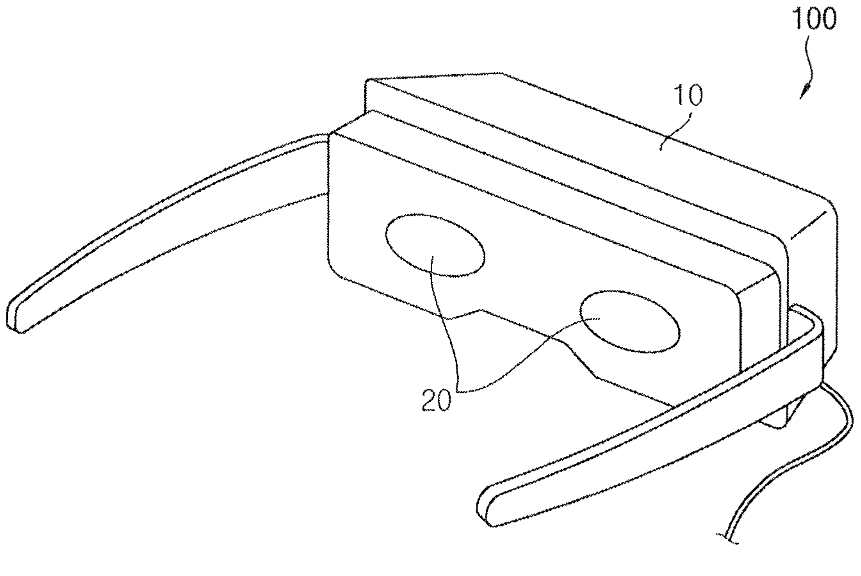
FIG. 1 illustrates an embodiment of a head-mounted display device.

Example embodiments will be described with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. The embodiments, or certain aspects thereof, may be combined to form additional embodiments.

In the drawings, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

When an element is referred to as being "connected" or "coupled" to another element, it can be directly connected or coupled to the another element or be indirectly connected or coupled to the another element with one or more intervening elements interposed therebetween. In addition, when an element is referred to as "including" a component, this indicates that the element may further include another component instead of excluding another component unless there is different disclosure.

FIG. 1 illustrates an embodiment of a head-mounted display device 100 (or head-mounted display system) which includes a display device 10 and a lens 20. The head-mounted display device 100 may be mounted on the head of a user and may further include a frame (or a case) to support the display device 10 and the lens 20. The lens 20 may be spaced from the display device 100 by a predetermined distance. The lens 20 may directly provide the eyes of the user with an image generated by the display device 10, when head-mounted display device 100 is mounted on the user. The lens 20 may be, for example, an eyepiece (or ocular eye piece). The head-mounted display device 100 may further include lenses, a reflector, and/or optical elements forming and adjusting an optical path to the eyes of the user.

Figure 2:
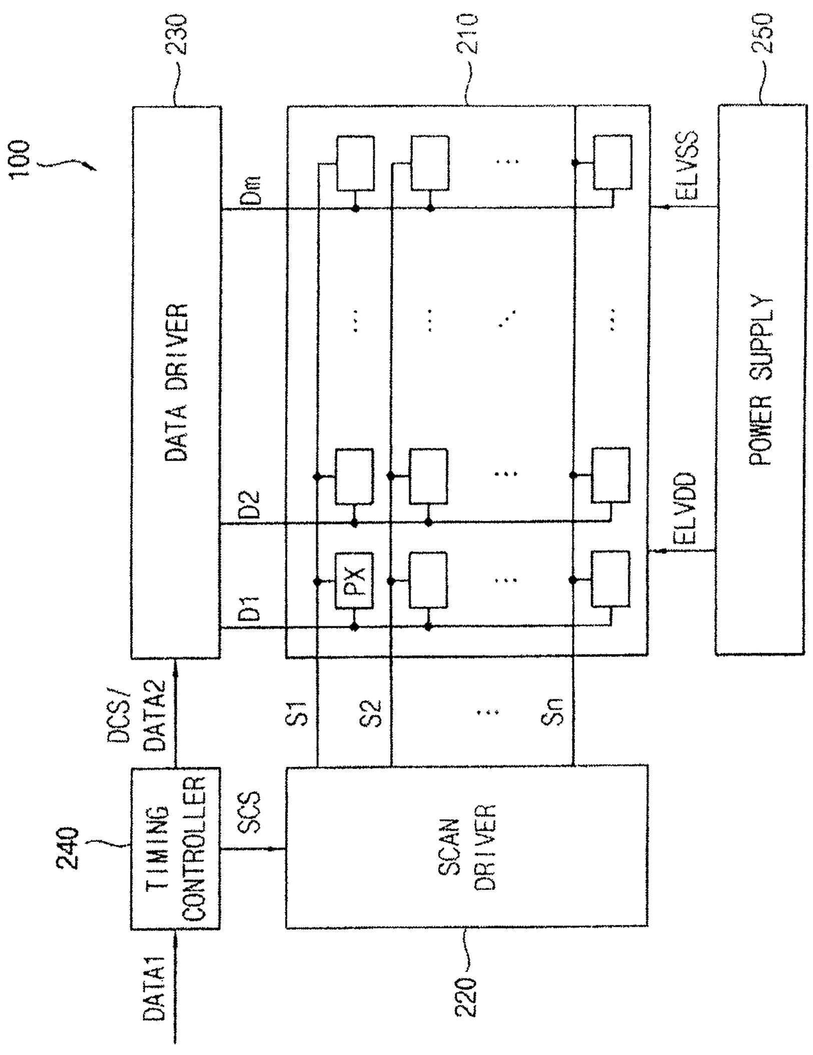
FIG. 2 illustrates an embodiment of a display device.
Figure 3A:
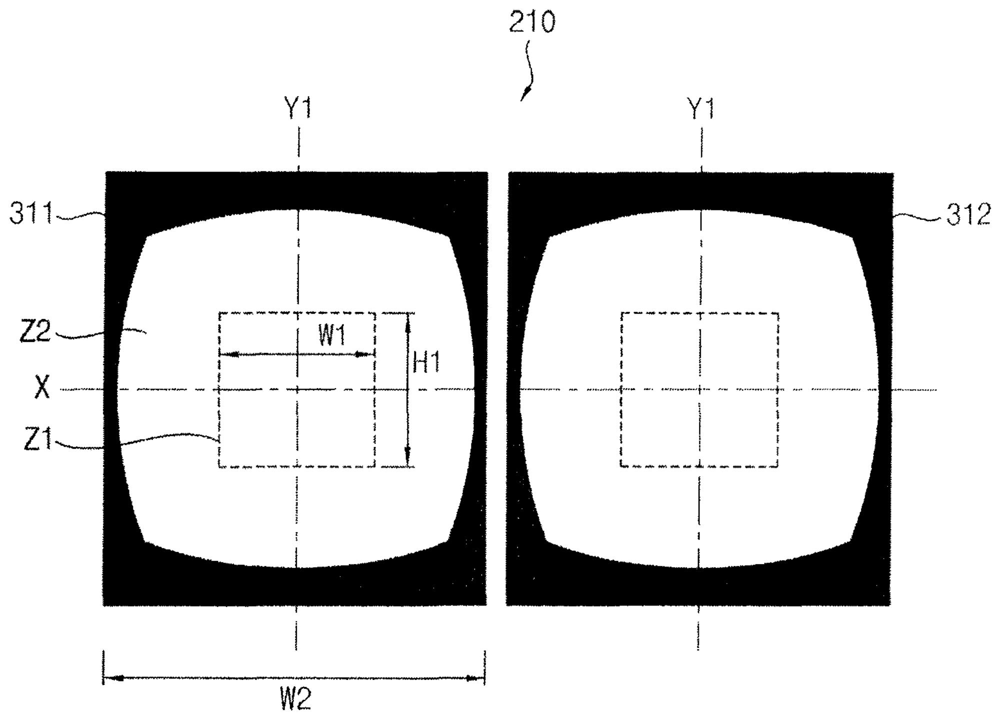
FIG. 3A illustrates an embodiment of a display panel.
Figure 3B:
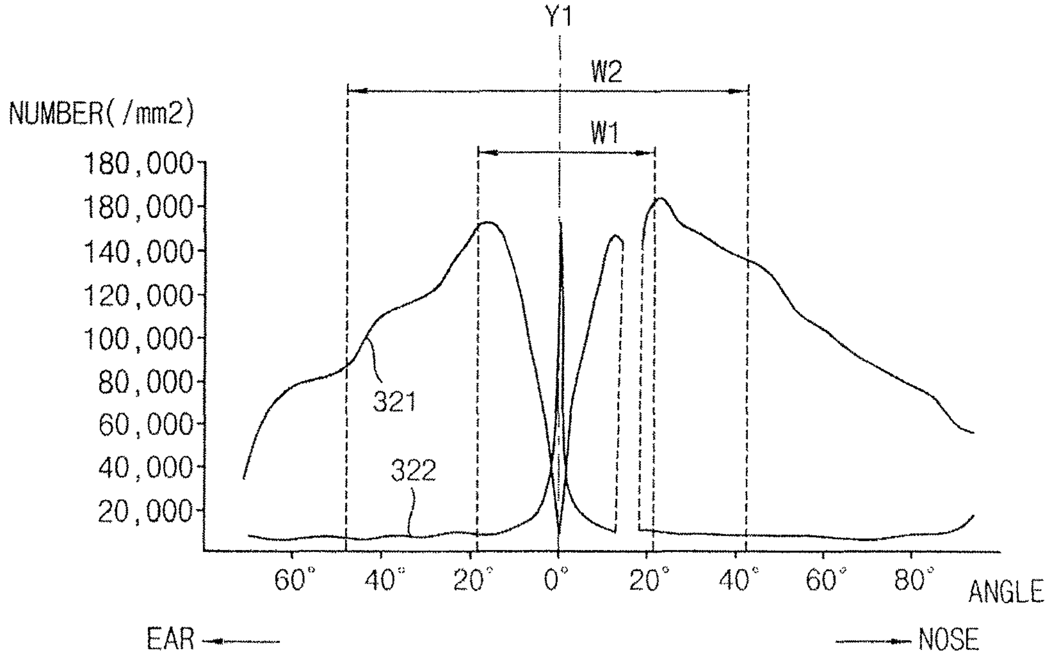
FIG. 3B illustrates an example of characteristics of the eyes of a user.

FIG. 2 illustrates an embodiment of the display device 10 which may be in the head-mounted display device 100 of FIG. 1. FIG. 3A illustrates an embodiment of a display panel 210 in the display device 10, and FIG. 3B illustrating an example of the characteristics of the eyes of a user.

Referring to FIG. 2, the display device 10 may include a display panel 210, a scan driver 220, a data driver 330, a timing controller 240, and a power supply 250. The display device 100 may display an image based on input image data (e.g., first data DATA1) provided from an external component (e.g., a graphics card). The display device 100 may be, for example, an organic light emitting display device. The input image data may be, for example, a three-dimensional (or 3D) image data, e.g., the input image data may include left image data and right image data to generate left and right images to be respectively provided to the eyes of the user.

The display panel 210 may include a plurality of pixels PX, a plurality of scan lines S1 through Sn, and a plurality of data lines D1 through Dm, where n and m are integers greater than or equal to 2. The pixels PX may be at respective cross-regions of the scan lines S1 through Sn and the data lines D1 through Dm. Each pixel PX may store a data signal (e.g., a data signal provided through the data lines D1 through Dm) based on a scan signal (e.g., a scan signal provided through the scan lines S1 through Sn) and may emit lights based on the stored data signal.

FIG. 3A illustrates an example of the display panel 210 which may include a first displaying region 311 and a second displaying region 312. The first displaying region 311 may display a first image (e.g., a left image) for one eye of the user (e.g., for a left eye of the user). The second displaying region 312 may display a second image (e.g., a right image) for the other eye of the user (e.g., for a right eye of the user).

The first displaying region 311 may include a first central region Z1 (or a first central area) and a first peripheral region Z2 (or a first peripheral area). The first central region Z1 may be in an area having a first radius with respect to a center point of the first displaying region 311. The center point of the first displaying region 311 may be a center of area of the first displaying region 311. For example, the first central region Z1 may be a rectangular area having a first width W1 and a first height H1 with respect to a first central axis Y1 (or a vertical axis) of the first displaying region 311. The first central axis Y1 may pass the center point of the first displaying region 311.

The first peripheral region Z2 may not overlap the first central region Z1 and may be in an area having a radius greater than the first radius with respect to a center point of the first displaying region 311. For example, the first peripheral region Z2 may be an area of the first displaying region 311 except the first central region Z1 and may be between the first width W1 and a second width W2. The second width W2 is greater than the first width W1.

The display panel 210 may further include a boundary region (or a boundary area) between the first central region Z1 and the first peripheral region Z2. The first central region Z1, the first peripheral region Z2, and the boundary region may be divided conceptually.

The second displaying region 312 may include a second central region and a second peripheral region, which may be symmetrical with (or may correspond to) the first central region Z1 and the first peripheral region Z2 with respect to a central axis (e.g., a vertical axis passing a center of area of the display panel 210), respectively. In some example embodiments, the first central region Z1 may be determined based on a viewing angle of the user to the display panel 210.

FIG. 3B illustrates an example of the distribution of photoreceptors in the left eye of a user. The photoreceptors may include cone cells and rod cells. Each cone cell may detect and identify brightness and colors. Each rod cell may detect relatively low light and may identify contrast or a shape of an object.

A first distribution curve 321 may represent a distribution of cone cells. According to the first distribution curve 321, the cone cells (or the density or number of the cone cells) may have a maximum value at about 20 degrees (or 20 degrees of the viewing angle of the user, e.g., 20 degrees in the direction toward the ear and 20 degrees in the direction to the nose) and may be distributed in the whole retina. The second distribution curve 322 may represent the distribution of the rod cells. According to the second distribution curve 322, the rod cells may be concentrated at 0 degrees (e.g., at a center of a retina).

According to the first distribution curve 321 and the second distribution curve 322, the visual recognition ability of the user may be concentrated in the range of 20 degrees (e.g., the range of 20 degrees in the direction through the ear and 20 degrees in the direction towards the nose). The user may be insensitive to a change of the image in a range other than the range of 20 degrees.

For reference, the user may recognize a view having an angle greater than 20 degrees of the viewing angle (or an object in an area corresponding to an angle greater than 20 degrees of the viewing angle) by rotating the head (not the eyes). For example, the user may recognize an image in a center of a screen (e.g., an image corresponding to a range within 20 degrees of the viewing angle) and may not recognize an image at a boundary of the screen (e.g., an image in a range exceeding 20 degrees of the viewing angle, or a change of luminance at the boundary of the screen).

Therefore, in accordance with the present embodiment, the display device 10 (or the head-mounted display device 100) may reduce or minimize a reduction in quality of an image visible to the user and may reduce power consumption by reducing luminance in a range exceeding 20 degrees of the viewing angle at which the visual recognition ability of the user is relatively poor (e.g., luminance of first peripheral region Z2).

For example, the display panel 210 (or the first display region 311) may display an image corresponding to a range within about 50 degrees of the viewing angle of the user when the user wears the head-mounted display device 100. The display panel 210 (or the second width W2 of the first displaying region 311) may correspond to an area having a range greater than an area having a range of 20 degrees of the viewing angle of the user. The first central region Z1 (or the first width W1 of the first central region Z1) may be determined to correspond to the range of 20 degrees of the user viewing angle.

In FIG. 3A, the display panel 210 includes the first displaying region 311 and the second display region 312. In one embodiment, the display panel 210 may include only the first displaying region 311 and a second display panel different from the display panel 210 may include the second displaying region 312. Thus, the display device 100 may include two display panels, instead of one display panel 210, and may drive the two display panels independently from each other.

Referring again to FIG. 2, the scan driver 220 may generate a scan signal based on a scan driving control signal SCS. The scan driving control signal SCS may include, for example, a start signal (or a start pulse) and clock signals. The scan driver 220 may include shift registers sequentially generating the scan signal based on the start signal and the clock signals.

The data driver 230 may generate data signals based on a data driving control signal DCS. For example, the data driver 230 may generate the data signals in analog form based on image data (e.g., second data DATA2) in digital form. The data driver 230 may generate the data signals based on predetermined grayscale voltages (or gamma voltages) from, for example, from a gamma circuit. The data driver 230 may sequentially provide the data signals to pixels in a pixel column.

In some example embodiments, the data driver 230 may generate a first data signal based on first sub image data (e.g., data corresponding to the first central region Z1) and may generate a second data signal based on second sub image data (e.g., data corresponding to the first peripheral region Z2). A second maximum value (or a second maximum grayscale voltage) of the second data signal may be less (or lower) than a first maximum value (or a first maximum grayscale voltage) of the first data signal. For example, the data driver 230 may include a first gamma block corresponding to (or to generate grayscale voltages for data corresponding to) the first central region Z1 and a second gamma block corresponding to (or to generate grayscale voltages for data corresponding to) the first peripheral region Z2. The data driver 230 may generate the first data signal using the first gamma block and may generate the second data signal using the second gamma block.

The timing controller 240 may receive the input image data (e.g., the first data DATA1) and input control signals (e.g., a horizontal synchronization signal, a vertical synchronization signal, and clock signals) from an external component (e.g., application processor). The timing controller 240 may also generate image data (e.g., the second data DATA2) compensated to be suitable for the display panel 210 for displaying an image. The timing controller 240 may also control scan driver 220 and data driver 230.

In some example embodiments, the timing controller 240 may generate converted data, for example, by converting the input image data to have maximum luminance of peripheral regions (e.g., the first peripheral region Z2) lower than maximum luminance of central regions (e.g., the first central region Z1). In one embodiment, the timing controller 240 may calculate an on-pixel ratio (ORP) of the input image data (e.g., the first data DATA1) and may generate the input data (e.g., the second data DATA2) by reducing (or by down scaling) the input image data based on the on-pixel ratio. The timing controller 240 may generate first sub converted data by reducing the first sub image data based on the on-pixel ratio and a first reference on-pixel ratio. The timing controller 240 may generate second sub converted data by reducing the second sub image data based on the on-pixel ratio and a second reference on-pixel ratio.

The on-pixel ratio may be a ratio of a number of activated pixels based on the input image data to a total number of pixels. The first sub image data may correspond to the central regions (e.g., the first central region Z1 and/or a second central region) among the input image data. The second sub image data may correspond to the peripheral regions (e.g., the first peripheral region Z2 and/or a second peripheral region) among the input image data. The first reference on-pixel ratio may be a reference value to be used to determine whether or not the first sub image data is reduced. The second reference on-pixel ratio may be a reference value to be used to determine whether or not the second sub image data is reduced. The first sub on-pixel ratio may be greater than the second sub on-pixel ratio.

In one embodiment, the timing controller 240 may generate the input data by reducing the first sub image data and the second sub image data based on different references (or based on different reference on-pixel ratios), respectively or independently from each other. For example, when the on-pixel ratio calculated by the timing controller 240 is in a specified range, the timing controller 240 may reduce only the second sub image data based on the on-pixel ratio.

The power supply 250 may generate and provide a driving voltage to the display panel 210 (or the pixel). The driving voltage may be power voltages to drive the pixel PX. For example, the driving voltage may include a first power voltage ELVDD and a second power voltage ELVSS. The first power voltage ELVDD may be greater (or higher) than the second power voltage ELVSS.

In accordance with the present embodiment, the display device 10 may convert the input image data to have a maximum luminance of the peripheral regions lower than a maximum luminance of the central regions. In addition, the display device 10 may apply (or may use) different references (e.g., the first reference on-pixel ratio and the second reference on-pixel ratio) for the first sub image data corresponding to the central regions and for the second sub image data corresponding to the peripheral regions. Furthermore, the display device 100 may determine the first and second image data (or the central regions and peripheral regions of the display panel 210) based on characteristics (or visual characteristics) of the eyes of a user. Therefore, the display device 100 may reduce power consumption without reducing display quality of an image which the user can recognize.

Figure 4:
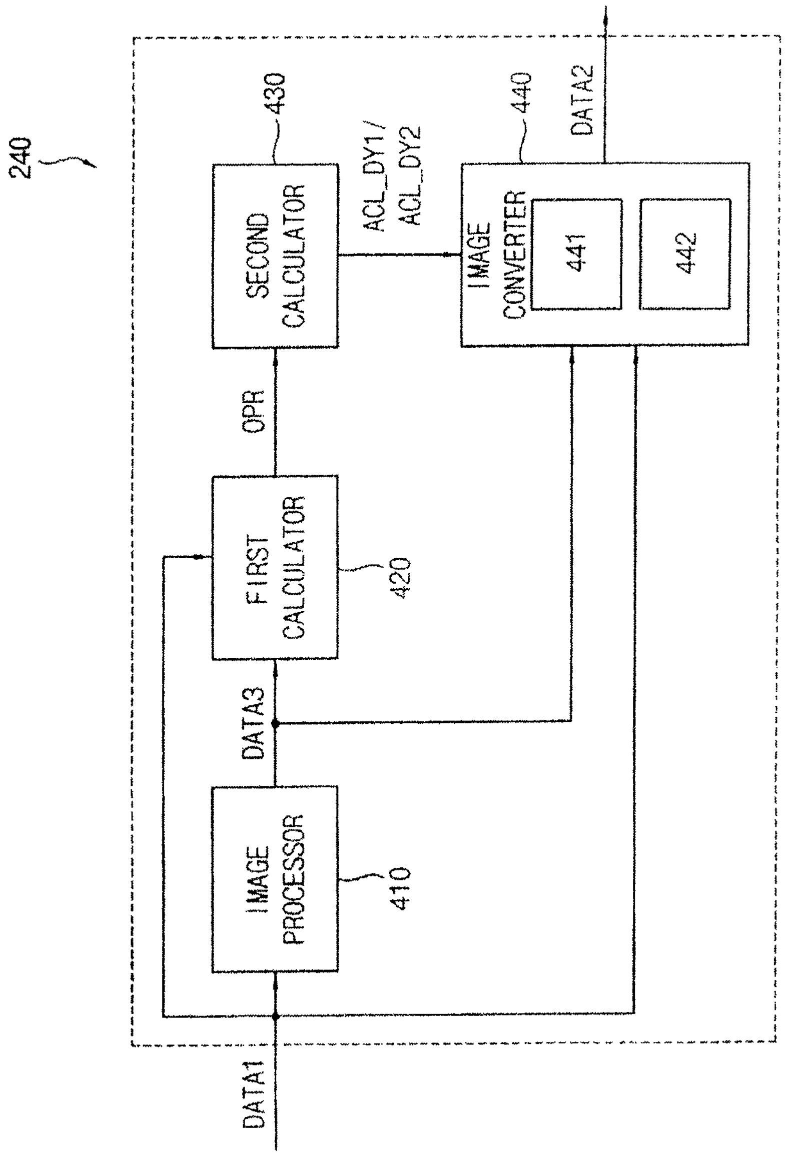
FIG. 4 illustrates an embodiment of a timing controller.
Figure 5:
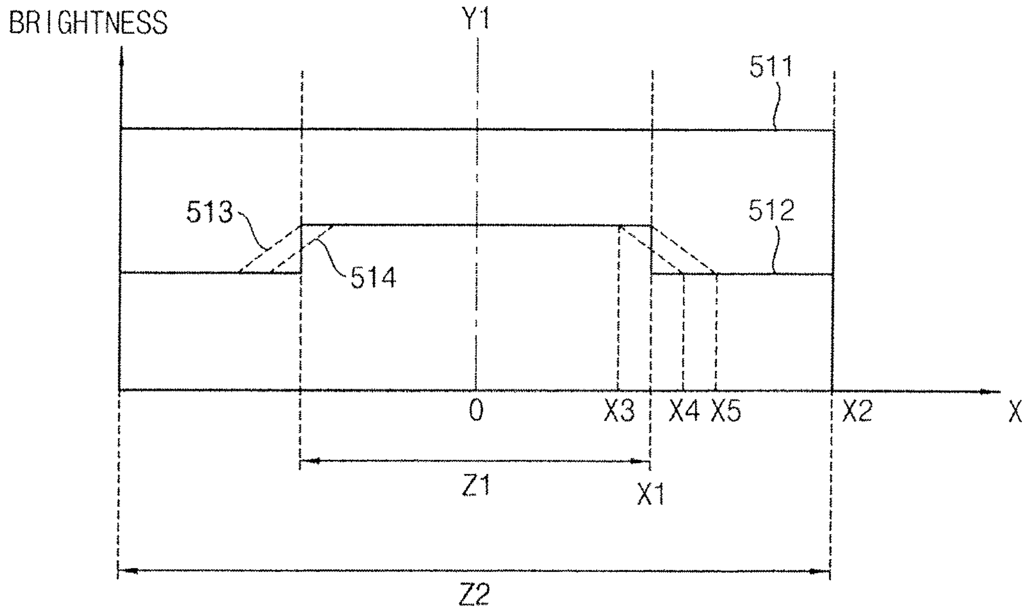
FIG. 5 illustrates an example of luminance controlled by the timing controller.
Figure 6A:
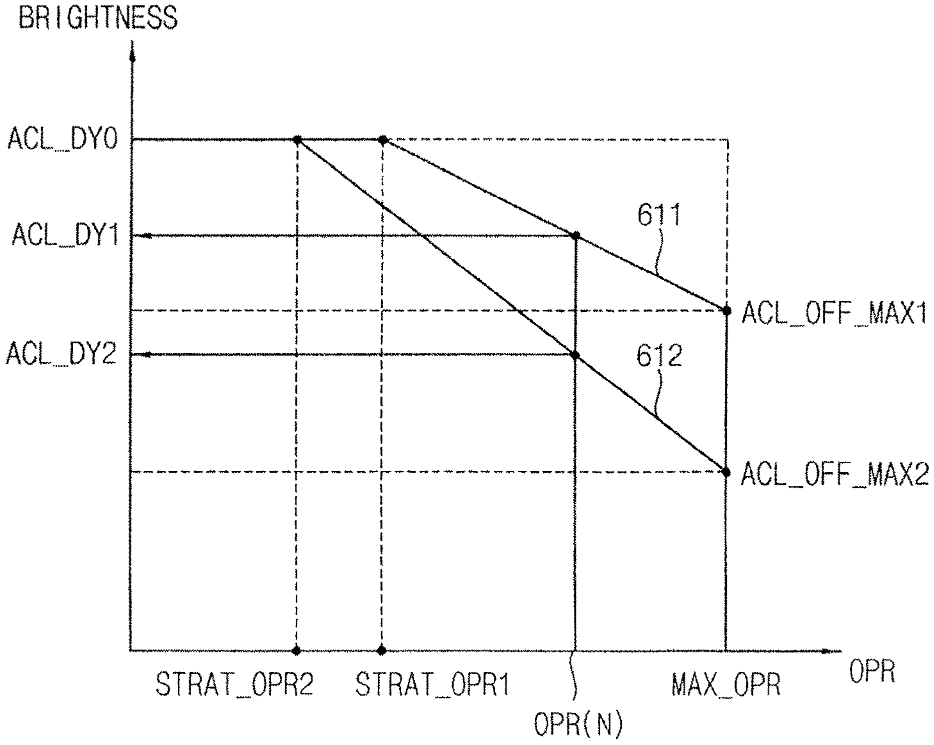
FIG. 6A illustrates an example of a scaling rate calculated by the timing controller.
Figure 6B:
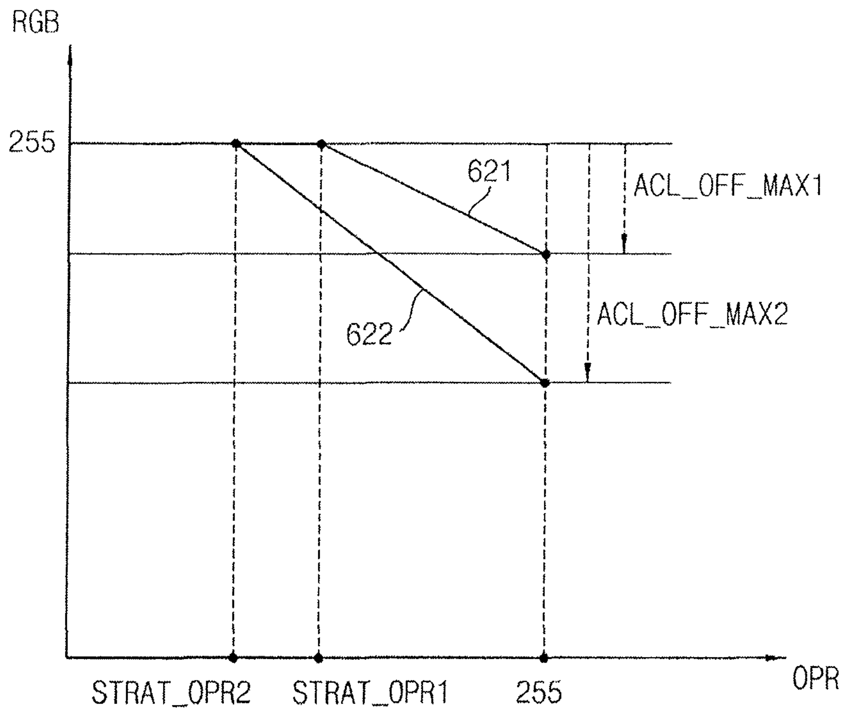
FIG. 6B illustrates an example of grayscale values remapped by the timing controller.
Figure 6C:
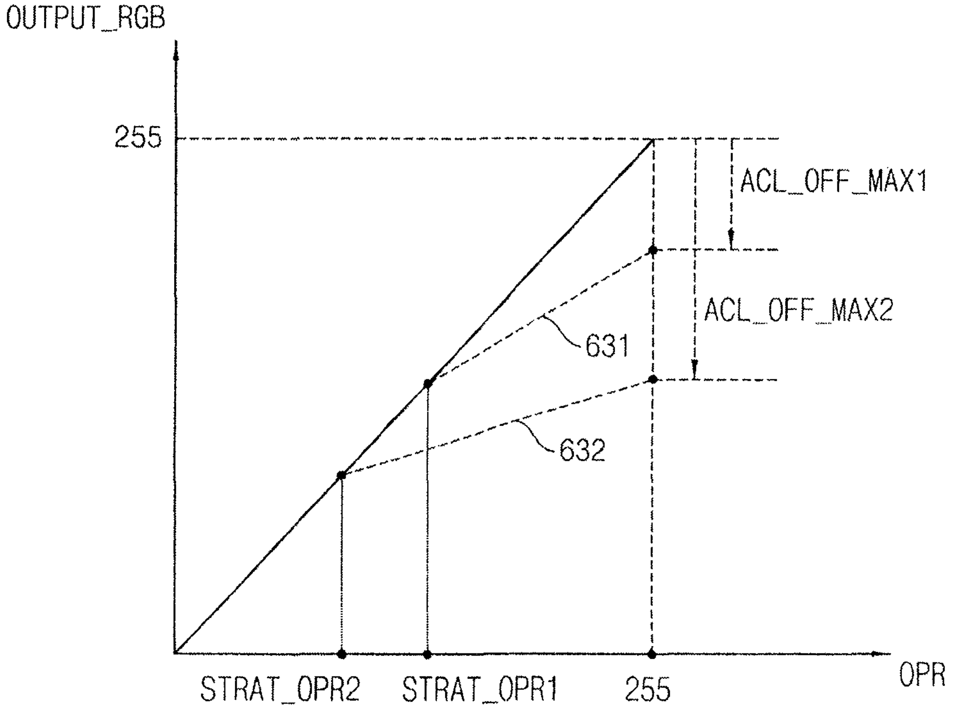
FIG. 6C illustrates another example of grayscale values remapped by the timing controller.

FIG. 4 illustrating an embodiment of the timing controller 240 in the display device 10 of FIG. 2. FIG. 5 illustrates an example of luminance controlled by the timing controller 240. FIG. 6A illustrates an example of a scaling rate calculated by the timing controller 240, FIG. 6B illustrates an example of grayscale values remapped by the timing controller 240, and FIG. 6C illustrates another example of grayscale values remapped by the timing controller 240.

Referring to FIG. 5, a first luminance curve 511 may represent luminance of an image displayed on the display panel 210 (or on the first displaying region 311 of the display panel 210) based on the input image data (e.g., the first data DATA1). A second luminance curve 512 may represent luminance of an image displayed on the display panel 210 based on converted data (e.g., the second data DATA2) generated by the timing controller 240. A third luminance curve 513 and a fourth luminance curve 514 may represent luminance of an image displayed on the display panel 210 based on other converted data (e.g., the second data DATA2) generated by the timing controller 240. An example of an operation of the timing controller 240 based on the second luminance curve 512 will be described below. Also, an operation of the timing controller 240 based on the third luminance curve 513 and fourth luminance curve 514 will be described.

Referring to FIGS. 4 through 6C, the timing controller 240 may include an image processor 410, a first calculator 420, a second calculator 430, and an image converter 440. The image processor 410 may generate image data (e.g., third data DATA3) by converting (or by resizing) the input image data (e.g., the first data DATA1) to have a resolution corresponding to a resolution of the display panel 210.

For example, the resolution of the input image data (e.g., a resolution of input image data in 2-dimensional format) may be 1920*1440, and the resolution of the display panel 210 may be 2560*1440. The image processor 410 may generate left image data based on some of the input image data which correspond to a resolution of 1280*1440 with respect to one side (e.g., a left side) of the input image data. The image processor 410 may generate right image data based on some of the input image data which correspond to a resolution of 1280*1440 with respect to the other side (e.g., a right side) of the input image data.

For example, the input image data (e.g., input image data in 3-dimensional format) may include left input image data and right input image data. The resolution of each of the left and right input image data may be 1920*1440, and the resolution of the display panel 210 may be 2560*1440. The image processor 410 may generate left image data based on some of the left input image data which correspond to a resolution of 1280*1440 with respect to one side (e.g., a left side) of the left input image data. The image processor 410 may generate right image data based on some of the input image data which correspond to a resolution of 1280*1440 with respect to the other side (e.g., a right side) of the right input image data.

The image processor 410 may not convert the input image data when the input image data has a format suitable for the display device 100. For example, the image processor 410 may convert the input image data into the image data suitable for the display device 100 (or for the head-mounted display device 10).

The first calculator 420 may calculate on-pixel ratio OPR of the image data (e.g., the third data DATA3). The on-pixel ratio OPR may represent a ratio of a driving amount when pixels in the display panel 210 are driven based on grayscale values of the image data to a total driving amount when the pixels are driven based on maximum grayscale values. The first calculator 420 may calculate the on-pixel ratio OPR, for example, for each frame of the image data.

The second calculator 430 may calculate a first scaling rate ACL_DY1 based on the on-pixel ratio ORP and a first reference on-pixel ratio START_OPR1, and may calculate a second scaling rate ACL_DY2 based on the on-pixel ratio ORP and a second reference on-pixel ratio START_OPR2. The first reference on-pixel ratio START_OPR1 may include or be based on a reference value for reducing the first sub image data described with reference to FIG. 3A (e.g., some of the image data corresponding to the first central region Z1 in FIG. 3A). The first scaling rate ACL_DY1 may be or include a reduction value of the first sub image data. Similarly, the second reference on-pixel ratio START_OPR2 may a reference value for reducing the second sub image data described with reference to FIG. 3A (e.g., some of the image data corresponding to the first peripheral region Z2 in FIG. 3A). The second scaling rate ACL_DY2 may be a reduction value of the second sub image data.

Referring to FIG. 6A, a first scaling curve 611 may represent the first scaling rate ACL_DY1 according to the on-pixel ratio OPR and a second scaling curve 612 may represent the second scaling rate ACL_DY2 according to the on-pixel ratio OPR.

According to the first scaling curve 611, when an Nth on-pixel ratio OPR(N) is less than the first reference on-pixel ratio START_OPR1, the first scaling rate ACL_DY1 may be equal to a reference scaling rate ACL_DY0, where N is a positive integer. The Nth on-pixel ratio OPR(N) may be an on-pixel ratio OPR calculated based on an Nth frame (or an Nth frame data) of the image data. The reference scaling rate ACL_DY0 may be, for example, a value of 1.

When the Nth on-pixel ratio OPR(N) is greater than the first reference on-pixel ratio START_OPR1, the first scaling rate ACL_DY1 may increase proportional to a difference between the Nth on-pixel ratio OPR(N) and the first reference on-pixel ratio START_OPR1. An increasing rate of the first scaling rate ACL_DY1 (or a first gradient of the first scaling curve 611) may be determined based on a first maximum scaling rate ACL_DY_MAX1. The first maximum scaling rate ACL_DY_MAX1 may be predetermined based on a reduction efficiency of the power consumption of the display device 10 (or the head-mounted display device 100).

In one embodiment, when the Nth on-pixel ratio OPR(N) is greater than the first reference on-pixel ratio START_OPR1, the second calculator 430 may calculate the first scaling rate ACL_DY1 based on Equation 1.

$$ACL\_DY1=ACL\_\mathrm{OFF\_MAX1}\times(\mathrm{OPR}(N)-\mathrm{START\_OPR1})/(\mathrm{MAX\_OPR}-\mathrm{START\_OPR1}) \quad (1)$$

where ACL_DY1 denotes the first scaling rate, ACL_OFF_MAX1 denotes the first maximum scaling rate, OPR(N) denotes the Nth on-pixel ratio, START_OPR1 denotes the first reference on-pixel ratio, and MAX_OPR denotes the maximum on-pixel ratio (e.g., a value of 1).

Similarly, according to the second scaling curve 612, when an Nth on-pixel ratio OPR(N) is less than the second reference on-pixel ratio START_OPR2, the second scaling rate ACL_DY2 may be equal to the reference scaling rate ACL_DY0.

When the Nth on-pixel ratio OPR(N) is greater than the second reference on-pixel ratio START_OPR2, the second scaling rate ACL_DY1 may increase proportional to a difference between the Nth on-pixel ratio OPR(N) and the second reference on-pixel ratio START_OPR2. An increasing rate of the second scaling rate ACL_DY2 (or a second gradient of the second scaling curve 612) may be determined based on a second maximum scaling rate ACL_DY_MAX2. The second maximum scaling rate ACL_DY_MAX2 may be different from the first scaling rate ACL_DY_MAX1 and may be predetermined based on a reduction efficiency of the power consumption of the display device 10 (or the head-mounted display device 100).

Similarly to a configuration of calculating the first scaling rate ACL_DY1, the second calculator 430 may calculate the second scaling rate ACL_DY2 based on Equation 2, when the Nth on-pixel ratio OPR(N) is greater than the second reference on-pixel ratio START_OPR2, $$ACL\_DY2=ACL\_\mathrm{OFF\_MAX2}\times(\mathrm{OPR}(N)-\mathrm{START\_OPR2})/(\mathrm{MAX\_OPR}-\mathrm{START\_OPR2}) \quad (2)$$

where ACL_DY2 denotes the second scaling rate, ACL_OFF_MAX2 denotes the second maximum scaling rate, OPR(N) denotes the Nth on-pixel ratio, START_OPR2 denotes the second reference on-pixel ratio, and MAX_OPR denotes the maximum on-pixel ratio (e.g., a value of 1).

As described with reference to FIG. 6A, the second calculator 430 may calculate the first scaling rate ACL_DY1 and the second scaling rate ACL_DY2 based on the on-pixel ratio OPR, respectively.

Referring again to FIG. 4, the image converter 440 may generate converted data (e.g., the second data DATA2) by reducing the image data (e.g., the third data DATA3) based on the first scaling rate ACL_DY1 and the second scaling rate ACL_DY2.

In some example embodiments, the image converter 440 may generate first sub converted data by reducing the first sub image data based on the first scaling rate ACL_DY1. The image converter 440 may generate second sub converted data by reducing the second sub image data based on the second scaling rate ACL_DY2. For example, the image converter 440 may include a first sub image converter 441 (or a first image converting unit) and a second sub image converter 442 (or a second image converting unit) and may generate the first and second sub converted data using the first sub image converter 441 and the second sub image converter 442, respectively.

Referring to FIG. 6B, a first mapping curve 621 may represent a change of a maximum grayscale value of the first sub image data according to the on-pixel ratio OPR. A second mapping curve 622 may represent a change of a maximum grayscale value of the second sub image data according to the on-pixel ratio OPR.

According to the first mapping curve 621, the maximum grayscale value of the first sub image data (e.g., a grayscale value of 255) may be changed based on the first scaling rate ACL_DY1. For example, when the on-pixel ratio OPR (or the Nth on-pixel ratio OPR(N)) is less than the first reference on-pixel ratio START_OPR1, the maximum grayscale value of the first sub image data may be mapped (or be remapped, be matched, be converted, correspond) to a grayscale value of 255. Thus, the maximum grayscale value of the first sub image data may be not reduced.

When the on-pixel ratio OPR (or the Nth on-pixel ratio OPR(N)) is greater than the first reference on-pixel ratio START_OPR1, the maximum grayscale value of the first sub image data may be mapped (or be converted) to a specified grayscale value less than a grayscale value of 255 according to a reduction of the first scaling rate ACL_DY1. The display device 10 (or the head-mounted display device 100) may reduce power consumption for the first sub image data by the first maximum scaling rate ACL_OFF_MAX1.

Similarly, according to the second mapping curve 622, the maximum grayscale value of the second sub image data (e.g., a grayscale value of 255) may be changed based on the second scaling rate ACL_DY2. For example, when the on-pixel ratio OPR is less than the second reference on-pixel ratio START_OPR2, the maximum grayscale value of the second sub image data may be mapped (or be converted) to a grayscale value of 255.

When the on-pixel ratio OPR is greater than the second reference on-pixel ratio START_OPR2, the maximum grayscale value of the second sub image data may be mapped (or be converted) to a specified grayscale value less than a grayscale value of 255 according to a reduction of the second scaling rate ACL_DY2. The display device 100 may reduce power consumption for the second sub image data by the second maximum scaling rate ACL_OFF_MAX2.

Referring to FIG. 6C, a third mapping curve 631 may represent a relation between the first sub image data and the first sub converted data. A fourth mapping curve 632 may represent a relation between the second sub image data and the second sub converted data.

According to the third mapping curve 631, grayscale values of the first sub image data may be remapped to grayscale values less than the grayscale values of the first sub image data. For example, grayscale values greater than a first reference grayscale value corresponding to the first reference on-pixel ratio START_OPR1 may be reduced, but grayscale values less than the first reference grayscale value may not be reduced.

Similarly, according to the third mapping curve 632, grayscale values of the second sub image data may be remapped to grayscale values less than the grayscale values of the second sub image data. For example, grayscale values greater than a second reference grayscale value corresponding to the second reference on-pixel ratio START_OPR2 may be reduced, but grayscale values less than the second reference grayscale value may not be reduced.

Therefore, the display device 10 (or the head-mounted display device 100) may prevent the display quality of an image from being degraded by limiting a reduction of grayscale value in a low grayscale range (e.g., grayscale values less than the first reference grayscale value or less than the second reference grayscale value).

As described with reference to FIGS. 4 through 6C, the timing controller 240 may calculate the on-pixel ratio OPR based on the image data (e.g., the third data DATA3 or the first data DATA1), may calculate the first scaling rate ACL_DY1 and the second scaling rate ACL_DY2 based on the first reference on-pixel ratio START_OPR1 and the second reference on-pixel ratio START_OPR2, and may convert the image data into the converted data (e.g., the second data DATA2) based on the first scaling rate ACL_DY1 and the second scaling rate ACL_DY2. Therefore, the display device 10 may reduce or minimize a reduction of the display quality of an image and may also reduce power consumption by reducing luminance (or brightness) of the image corresponding to the central regions and luminance of the image corresponding to the central regions, independently (or differently).

In some example embodiments, the timing controller 240 (or the image converter 440) may gradually reduce a boundary image data based on the first scaling rate ACL_DY1 and the second scaling rate ACL_DY2. The boundary image data may be between the first sub image data and the second image data.

Referring to FIG. 5, the first sub image data described above may correspond to the first central region Z1 between a reference point (e.g., a zero point on an X axis) and a first point X1. The second sub image data described above may correspond to the first peripheral region Z2 between the first point X1 and a second point X2. However, when the timing controller uses the third luminance curve 513, the second sub image data may correspond to a region between a fifth point X5 and the second point X2. The boundary image data may correspond to a region (e.g., a boundary region) between the first point X1 and the fifth point X5.

The timing controller 240 may apply a scaling rate ACL_DY differently according to the location of a certain point in the boundary region. For example, the timing controller 240 may calculate a third scaling rate by interpolating the first scaling rate ACL_DY1 and the second scaling rate ACL_DY2 based on the location (or location information) of the certain point and may reduce image data (or a grayscale value) corresponding to the certain point based on the third scaling rate. For example, the timing controller 240 may calculate a distance variable (or a distance ratio, a distance weight) based on the location of the certain point and may calculate the third scaling rate based on the distance variable and at least one of the first scaling rate ACL_DY1 and the second scaling rate ACL_DY2. The timing controller 240 may reduce the boundary image data based on the third scaling rate.

In one embodiment, the timing controller 240 may calculate the third scaling rate based on Equation 3

$$ACL\_DYF = ACL\_DY \times DR \qquad (3)$$

where ACL_DYF denotes the third scaling rate, ACL_DY denotes the scaling rate and DR denotes the distance variable.

Similarly, when the timing controller 240 uses the fourth luminance curve 514, the first sub image data may correspond to a region between the reference point (e.g., the zero point) and a third point X3. The second sub image data may correspond to a region between a fourth point X4 and the second point X2. The boundary image data may correspond to a region (or a boundary region) between the third point X3 and the fourth point X4.

As described with reference to FIG. 5, the display device 10 (or the head-mounted display device 100) may reduce the boundary image data based on the third scaling rate (e.g., a scaling rate calculated by interpolating the first scaling rate ACL_DY1 and the second scaling rate ACL_DY2). Therefore, the display device 10 may prevent a boundary between a central region and a peripheral region of an image (e.g., between images respectively corresponding to the first central region Z1 and the first peripheral region Z2) being visible to the user.

Figure 7:
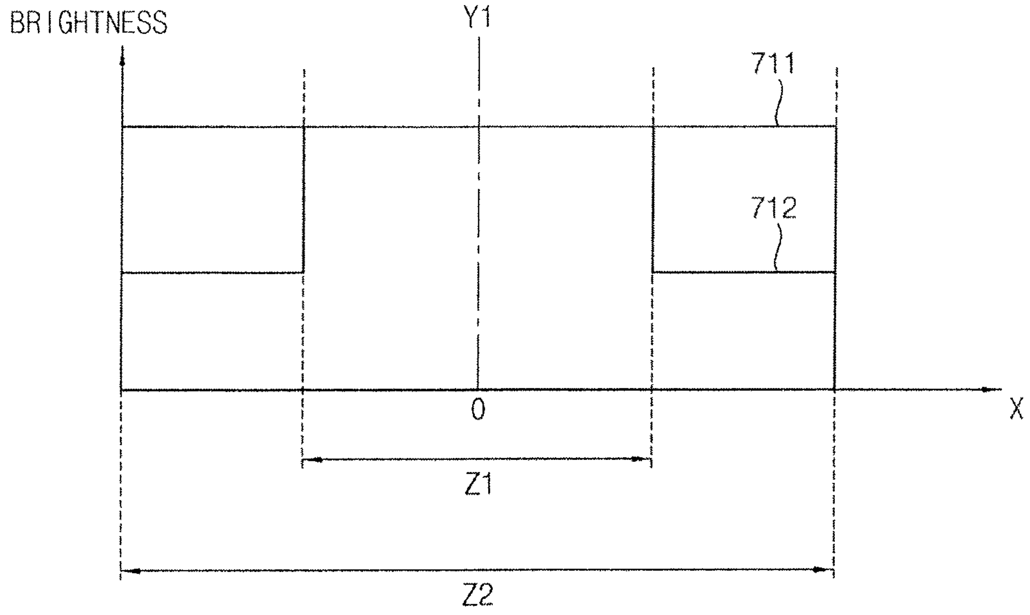
FIG. 7 illustrates another example of luminance controlled by the timing controller.

FIG. 7 illustrates another example of luminance controlled by the timing controller of FIG. 4. Referring to FIGS. 5 and 7, a fifth luminance curve 711 may be substantially the same as the first luminance curve 511 described with reference to FIG. 5. A sixth luminance curve 712 may be similar to the second luminance curve 512 described with reference to FIG. 5. However, image data corresponding to the first central region Z1 (e.g., the first sub image data) may not be reduced according to the sixth luminance curve 712.

Thus, the display device 10 may reduce only second sub image data corresponding to the first peripheral region Z2 based on the second scaling rate ACL_DY2 and may maintain the first sub image data. For example, the display device 100 (or the head-mounted display device 10) may determine the first reference on-pixel ratio START_OPR1 described with reference to FIG. 6A to be equal to the maximum on-pixel ratio MAX_OPR. The first sub image data may not be changed or reduced even though the on-pixel ratio OPR is changed.

Thus, the display device 100 may perform no conversion operation (or no data conversion) for the first central region Z1 in which the visual characteristics of the user are good. The reduction amount of power consumption may be less than the reduction amount of power consumption of the second luminance curve 512 in FIG. 5, but the display device 100 may reduce or minimize the reduction of display quality of an image seen by the user.

Figure 8A:
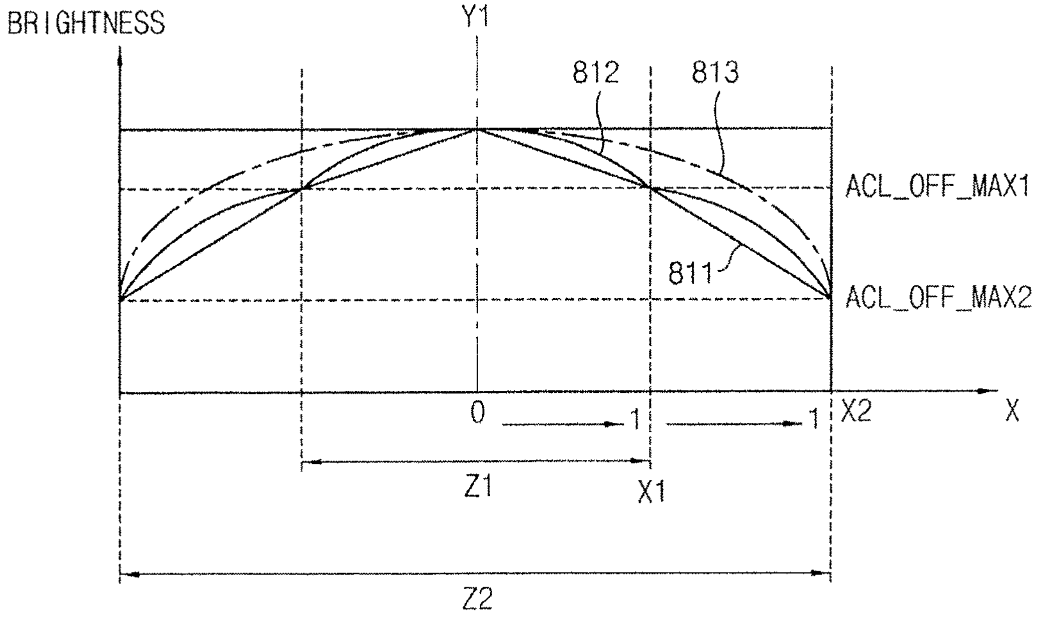
FIG. 8A illustrates another example of luminance controlled by the timing controller.

FIG. 8A illustrates examples of luminance controlled by the timing controller of FIG. 4. Referring to FIGS. 5 and 8A, eleventh through thirteenth luminance curve 811, 812, and 813 may represent a luminance of an image displayed on the display panel 210 (or on the first displaying region 311 of the display panel 210) based on the image data (e.g., the first data DATA1). In some example embodiments, the display device 100 (or the timing controller 240) may apply (or use)

the scaling rate ACL_DY according to a location of a certain point on the display panel 210.

In an example embodiment, when the certain point is in the first central region Z1, the display device 10 may calculate a fourth scaling rate by interpolating a reference scaling value ACL_DY0 and the first scaling rate ACL_DY1 based on the location (or location information) of the certain point. The display device 10 may reduce image data (or a grayscale value) corresponding to the certain point based on the fourth scaling rate. When the certain point is in the first peripheral region Z2, the display device 10 may calculate a third scaling rate by interpolating the first scaling rate ACL_DY1 and the second scaling rate ACL_DY2 based on the location (or location information) of the certain point and may reduce image data (or a grayscale value) corresponding to the certain point based on the third scaling rate. For example, when the display device 10 uses a linear interpolating manner, luminance of the image may be changed according to the eleventh luminance curve 811. When the display device 10 uses a non-linear interpolating manner, luminance of the image may be changed, for example, according to the twelfth luminance curve 812.

In an example embodiment, the display device 100 may calculate a fifth scaling rate by interpolating the reference scaling rate ACL_DY0 and the second scaling rate ACL_DY2 based on the location (or location information) of the certain point and may reduce image data (or a grayscale value) corresponding to the certain point based on the fifth scaling rate. Luminance of the image may be changed according to the thirteenth luminance curve 813.

As described with reference to FIG. 8A, the display device 10 (or the head-mounted display device 100) may reduce the image data using the third through fifth scaling rate (e.g., scaling rate calculated based on two of the reference scaling rate ACL_DY0, the first scaling rate ACL_DY1, or the second scaling rate ACL_DY2). Luminance of the image may be changed (or reduced) gradually from a center of the image to a boundary of the image. Therefore, the display device 100 may prevent a reduction of display quality visible to a user, even for a second maximum scaling rate ACL_OFF_MAX2 (e.g., even when the display 10 uses a maximum scaling rate less than the second maximum scaling rate ACL_OFF_MAX2 described with reference to FIG. 6A).

Figure 8B:
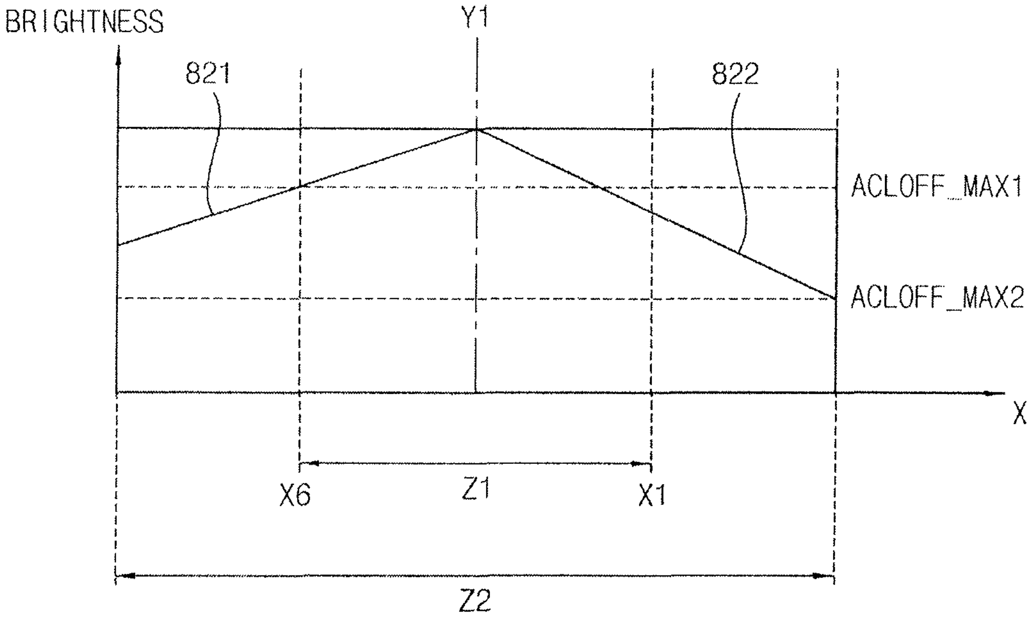
FIG. 8B illustrates another example of luminance controlled by the timing controller.

FIG. 8B illustrates another example of luminance controlled by the timing controller of FIG. 4. Referring to FIG. 8B, a twenty-first luminance curve 821 may represent luminance of an image displayed on a first sub region of the display panel 210 based on the image data (e.g., the first data DATA1). A twenty-second luminance curve 822 may represent luminance of an image displayed on a second sub region of the display panel 210 based on the image data. The first sub region may be a left region of the display panel 210 with respect to a first central axis Y1 and may include a sixth point X6. The second sub region may be a right region of the display panel 210 with respect to the first central axis Y1 and may include the first point X1.

In some example embodiments, the display device 10 (or the head-mounted display device 100) may calculate a weight scaling rate (or a weight) based on direction information of a certain point and may reduce the image data based on the weight scaling rate. The direction information may be a direction of the certain point with respect to a center of the display panel 210 (e.g., a left direction or a right direction with respect to the first central axis Y1 of the first displaying region 311).

When the certain point is in the first sub region (e.g., at the sixth point X6), the display device 100 may determine the weight scaling rate to be a predetermined value, e.g., 0.5. The display device 100 may calculate a converted grayscale value (e.g., a grayscale value in the converted data) by multiplying a grayscale value corresponding to the certain point, the weight scaling rate, and the third scaling rate (or the fourth scaling rate) described with reference to FIG. 8A. Luminance at the first sub region may be changed according to the twenty-first luminance curve 821.

When the certain point is in the second sub region (e.g., at the first point X1), the display device 100 may determine the weight scaling rate to be a predetermined value, e.g., 1. The display device 100 may calculate a converted grayscale value (e.g., a grayscale value in the converted data) by multiplying a grayscale value corresponding to the certain point, the weight scaling rate, and the third scaling rate (or the fourth scaling rate) described with reference to FIG. 8A. Luminance at the second sub region may be changed according to the twenty-second luminance curve 822.

The weight scaling rate may be determined based on the characteristics of the eyes of the user described with reference to FIG. 3B. Referring to FIG. 3B, the gradient of a left region (e.g., a region in direction from zero degrees to the nose of the user) may be greater than the gradient of a right region (e.g., a region in direction from zero degrees to an ear of the user). Therefore, the display device 100 may reduce luminance of the image by determining the weight scaling rate differently according to direction information of the certain point.

Figure 9:
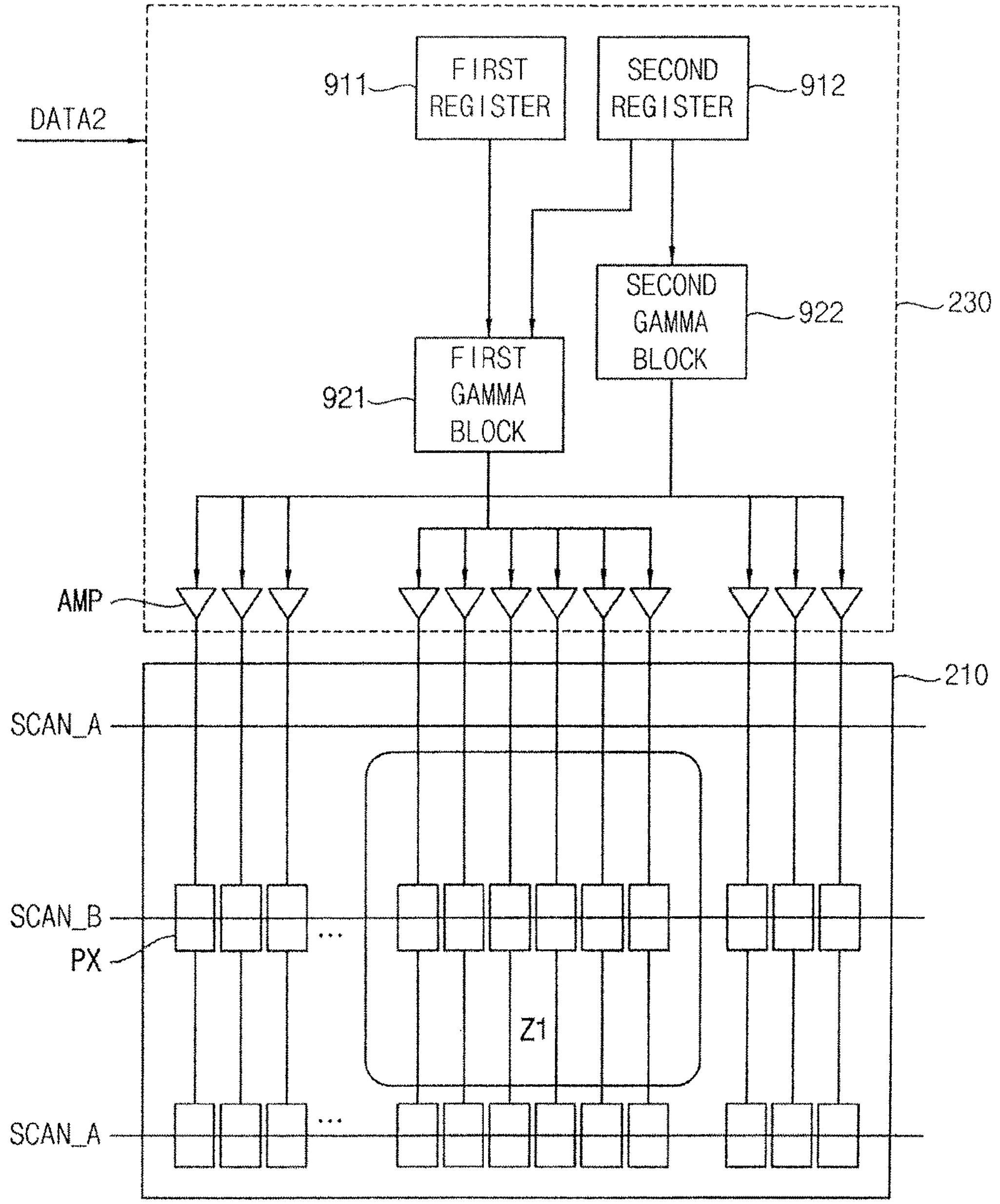
FIG. 9 illustrates an embodiment of a data driver.
Figure 10:
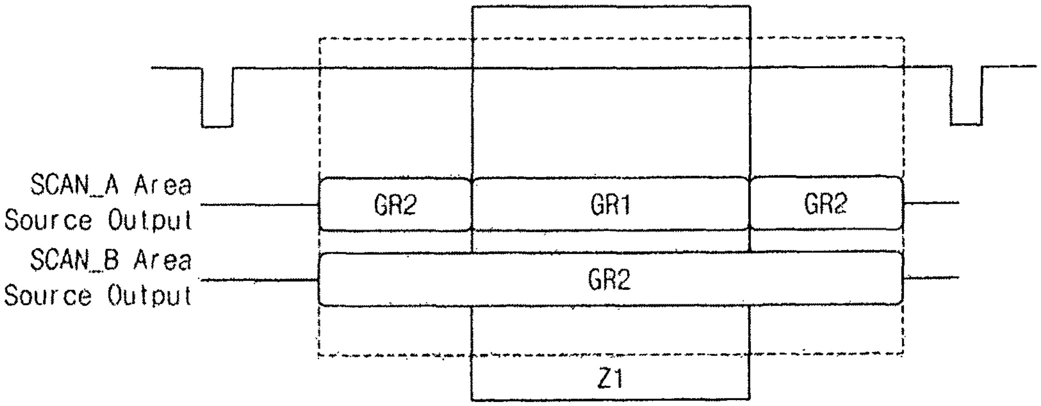
FIG. 10 illustrates an embodiment of an operation of the data driver.

FIG. 9 illustrates an embodiment of a data driver 230 in the display device 10 of FIG. 2. FIG. 10 illustrates an embodiment of the operation of data driver 230. Referring to FIGS. 1, 2, 3A, and 9, the data driver 230 may include a first gamma register 911, a second gamma register 912, a first gamma block 921, and a second gamma block 922. The data driver 230 may generate a first data signal based on the first sub image data and may generate a second data signal based on the second sub image data.

The first gamma register 911 may store the first sub image data temporally and may output first grayscale values of the first sub image data.

The second gamma register 912 may store the second sub image data temporally and may output second grayscale values of the second sub image data.

The first gamma block 921 may generate the first data signal based on a grayscale value and first grayscale voltages which are predetermined. The grayscale value may be one of the first grayscale values or the second grayscale values. For example, the first gamma block 921 may output a certain grayscale voltage corresponding to the one of the first grayscale values or the second grayscale values based on a first gamma curve (e.g., a gamma curve 2.2.).

The second gamma block 922 may generate the second data signal based on a grayscale value and second grayscale voltages which are predetermined. The second grayscale voltages may be different from the first grayscale voltages. For example, a maximum grayscale voltage of the second grayscale voltages may be 5 volts (V), and a maximum grayscale voltage of the first grayscale voltages may be 3 V. The second gamma block 922 may be operated when the scan signal is provided to the first central region Z1. For example, when the scan signal is provided to the first central region Z1, the timing controller 240 may provide the data driver 230 with a control signal to operate the second gamma block 922.

Thus, the display device 100 may generate the data signal using gamma blocks different from each other for each region of the display panel 210 (e.g., for each of the central and peripheral regions), instead of converting the input image data using the timing controller 240. An output buffer AMP may provide the first data signal and/or the second data signal to the display panel 210 (or the pixel PX in the display panel 210).

Referring to FIGS. 9 and 10, a first scan signal SCAN_A may be provided to the display panel 210 to control output the data signal (e.g., the second data signal) to only the first peripheral region Z2. The data driver 230 may provide the second data signal to the display panel using the second gamma register 912 and the second gamma block 922. For example, the data driver 230 may provide the second data signal to all output buffers AMP using the second gamma register 912 and the second gamma block 922, and the pixel PX in the first peripheral region Z2 may emit light based on the second data signal based on the first scan signal SCAN_A.

Subsequently, a second scan signal SCAN_B may be provided to the display panel 210 to control output the data signal (e.g., the first data signal) to only the first central region Z1. The data driver 230 may provide the first data signal to the display panel using the first gamma register 911 and the first gamma block 921. In addition, the data driver 230 may provide the second data signal to a remaining region except the first central region Z1 (e.g., the pixel PX in the first peripheral region Z2 that receives the second scan signal SCAN_B) using the second gamma register 912 and the second gamma block 922.

Thus, a pixel column corresponding to the first peripheral region Z2 may receive the second data signal from the second gamma block 922, and a pixel column corresponding to the first central region Z1 may alternately receive the first data signal and second data signal from the first gamma block 921 and second gamma block 922.

As described with reference to FIGS. 10 and 11, the display device 100 may generate the data signal using the gamma blocks which are different from each other for each region of the display panel 210 (for each of central regions and peripheral region). Therefore, the display device 100 may display an image with different luminance for each region.

Figure 11:
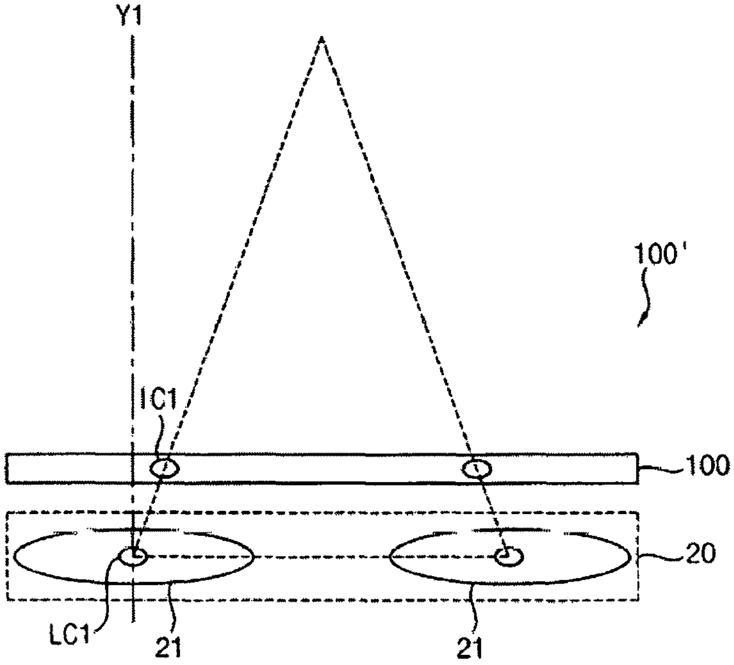
FIG. 11 illustrates another embodiment of a head-mounted display device.
Figure 12:
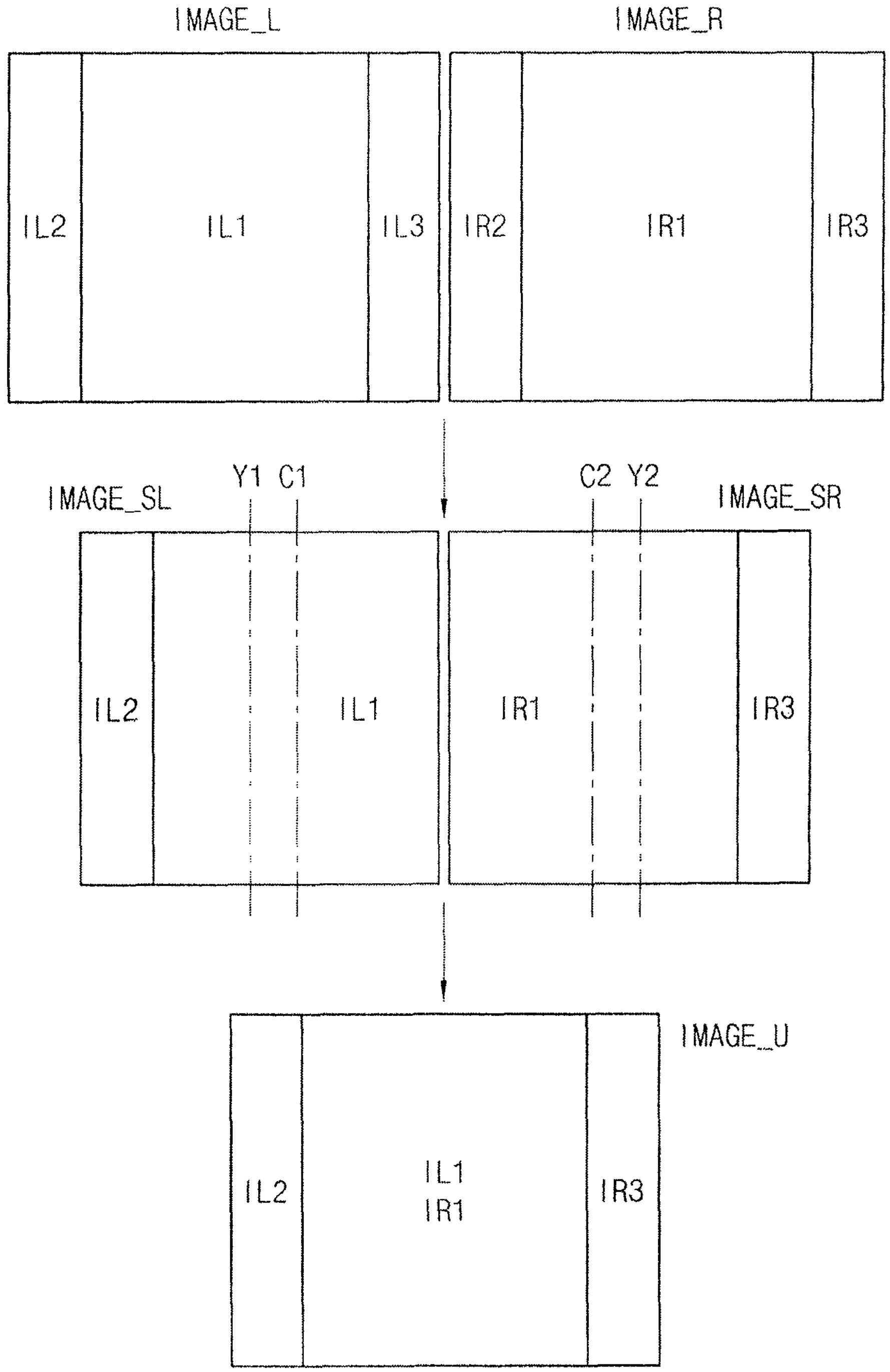
FIG. 12 illustrates an example of input image data processed by the timing controller in FIG. 4.
Figure 13:
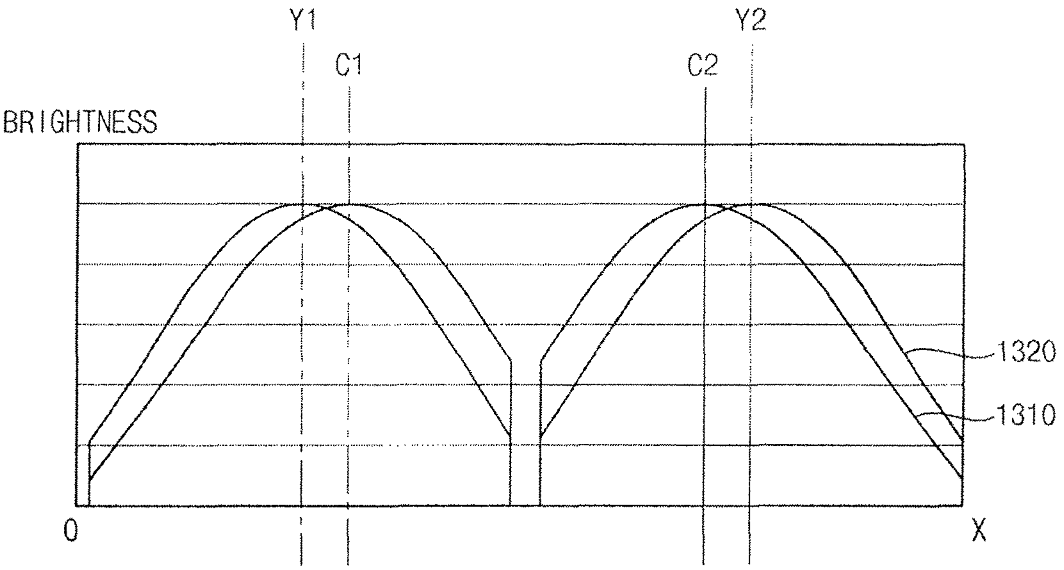
FIG. 13 illustrates another example of luminance controlled by the timing controller in FIG. 4.

FIG. 11 illustrates another embodiment of a head-mounted display device 100'. FIG. 12 illustrates an example of input image data processed by the timing controller 240 of FIG. 4, which may be included in the head-mounted display device 100'. FIG. 13 illustrates other examples of luminance controlled by the timing controller 240 in FIG. 4.

Referring to FIG. 11, the lens 20 may be located apart from the display device 10 by a predetermined distance. The lens 20 may include a first lens 21 (or a left lens) and a second lens 22 (or a right lens). A focus (or a point at which a viewing axis of a left eye and a viewing axis of a right eye are crossed) of the user wearing the head-mounted display device 100' may be formed at a certain point apart to the display device 10. According to the focus, a first viewing direction of the left eye (or a first viewing axis) and a second viewing direction of the right eye (or a second viewing axis) of the user may not be perpendicular to the display device 10.

An image center IC1 (or a center point) of an image displayed on the display device 10 (or on the first displaying region 311 of the display panel 210) may be located at an axis perpendicular to the display device 10, passing through the lens center LC1, and different from a first viewing axis. Therefore, the display device 10 may shift the image in a certain direction to match the image center IC1 and the lens center LC1. Thus, the display device 10 may shift the image in the certain direction to locate the image center IC1 on the first viewing axis formed from the lens center LC1.

Referring to FIG. 12, a first left image IMAGE_L and a first right image IMAGE_R may be in (or correspond to) the input image data (e.g., image data provided from an external component to the display device 10) and may include three sub images (e.g., first through third sub left images IL1 through IL3 or first through third sub right images IR1 through IR3). The first through third sub left images IL1 through IL3 may correspond to the first through third sub right images IR1 through IR3. The first through third sub left images IL1 through IL3 may be, for example, the same as or substantially the same as the first through third sub right images IR1 through IR3.

A second left image IMAGE_SL and a second right image IMAGE_SR may be in (or correspond to) converted data (e.g., the second data DATA2 generated by the display device 10). The display device 10 may shift the first left image IMAGE_L in a right direction by a certain distance, so that the second left image IMAGE_SL includes the first and second sub left images IL1 and IL2. Similarly, the display device 10 may shift the first right image IMAGE_R in a left direction by the certain distance, so that the second right image IMAGE_SR includes first and third sub right images IR1 and IR3.

A third image IMAGE_U may be an image visible (or may be recognized) by the user. The third image IMAGE_U may include the second sub left image IL2, the first sub left image IL1, the first sub right image IR1, and the third sub right image IR3. The first sub left image IL1 and the first sub right image IR1 may overlap at a central area of the third image IMAGE_U (e.g., an area corresponding to the first sub right image IR1). The second sub left image IL2 may be visible to the left eye of the user, and the third sub right image IR3 may be visible to the left eye of the user. Therefore, when luminance of the second sub left image IL2 (and/or luminance of the third sub right image IR3) is greatly reduced, a reduction of luminance may be recognized by the user.

Referring to FIG. 13, a thirty-first luminance curve 1310 represents luminance of an image displayed on the display panel 210 when the display device 10 generates the converted data based on a center of the display panel 210 (e.g., a first area center Y1 and a second area center Y2 of the display panel 210). A thirty-second luminance curve 1320 represents luminance of an image displayed on the display panel 210 when the display device 100 generates the converted data based on a center of the input image data (e.g., a first image center C1 of the first left image IMAGE_L and a second image center C2 of the first right image IMAGE_R).

Luminance corresponding to a boundary of the display panel 210 (e.g., an area corresponding to the second sub left image IL2 and the third sub right image IR3 illustrated in FIG. 12) according to the thirty-second luminance curve 1320 may be greater than luminance corresponding to a boundary of the display panel 210 according to the thirty-first luminance curve 1310.

Therefore, the display device 100 may prevent a reduction of luminance being visible for the user by generating the converted data based on the center of the input image data (e.g., a first image center Y1 and a second image center Y2 of the input image data) compared with generating the converted data based on the center of the display panel 210

(e.g., a first area center Y1 and a second area center Y2 of the display panel 210). Thus, the display device 10 may efficiently prevent a reduction of luminance from being visible for the user and reduce power consumption, for example, by the same amount. In addition, the display device 10 may improve the reduction rate of power consumption with reducing luminance, for example, by the same amount (e.g., with reducing luminance at a boundary of the display panel 210 by the same amount)

As described with reference to FIGS. 11 through 13, the display device 100 may efficiently prevent a reduction of luminance from being visible for the user and reduce power consumption by the same amount, by generating the converted data based on the center of the input image data (e.g., a first image center Y1 and a second image center Y2 of the input image data).

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods described herein.

The controllers, processors, calculators, blocks, converters, and other processing features of the embodiments described herein may be implemented in logic which, for example, may include hardware, software, or both. When implemented at least partially in hardware, the controllers, processors, calculators, blocks, converters, and other processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the controllers, processors, calculators, blocks, converters, and other processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

The aforementioned embodiments may be applied to any type of display device, e.g., an organic light emitting display device, a liquid crystal display device, etc. The display device may be in, for example, a television, a computer monitor, a laptop, a digital camera, a cellular phone, a smart phone, a personal digital assistant, a portable multimedia player, an MP3 player, a navigation system, and a video phone.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A display device, comprising:

a display panel;

a timing controller to convert image data to converted data; and a data driver to generate a data signal based on the converted data and to provide the data signal to the display panel, wherein:

the converted data includes first sub converted data corresponding to a central region of a user viewing angle and second sub converted data corresponding to a peripheral region of the user viewing angle, so that a maximum luminance of the peripheral region of the user viewing angle is less than a maximum luminance of the central region of the user viewing angle, and the peripheral region is a region exceeding predetermined degrees of the user viewing angle, wherein the timing controller is to:

calculate an on-pixel ratio of the image data, generate the first sub converted data by reducing first sub image data among the image data based on the on-pixel ratio and a first reference on-pixel ratio, the first reference on-pixel ratio being equal to a maximum on-pixel ratio, and generate the second sub converted data by reducing second sub image data among the image data based on the on-pixel ratio and a second reference on-pixel ratio different from the first reference on-pixel ratio.

2. The display device as claimed in claim 1, wherein the on-pixel ratio is a ratio of a driving amount when pixels in the display panel are driven based on the image data to a driving amount when the pixels are driven with a maximum grayscale value.

3. The display device as claimed in claim 1, wherein the peripheral region is a region exceeding 20 degrees of the user viewing angle.

4. The display device as claimed in claim 1, wherein the timing controller includes:

a first calculator to calculate the on-pixel ratio based on the image data;

a second calculator to calculate a first scaling rate based on the on-pixel ratio and the first reference on-pixel ratio and to calculate a second scaling rate based on the on-pixel ratio and the second reference on-pixel ratio; and an image converter to generate the first sub converted data by reducing the first sub image data based on the first scaling rate and to generate the second sub converted data by reducing the second sub image data based on the second scaling rate.

5. The display device as claimed in claim 4, wherein the second calculator is to calculate the first scaling rate based on Equation 1 when the on-pixel ratio is greater than the first reference on-pixel ratio:

$$ACL\_DY1=ACL\_\text{OFF\_MAX1}\times(\text{OPR}(N)-\text{START\_OPR1})/(\text{MAX\_OPR}-\text{START\_OPR1}) \quad (1)$$

where ACL_DY1 denotes the first scaling rate, ACL_OFF_MAX1 denotes a first maximum scaling rate, OPR(N) denotes the on-pixel ratio, START_OPR1 denotes the first reference on-pixel ratio, and MAX_OPR denotes the maximum on-pixel ratio.

6. The display device as claimed in claim 5, wherein the second calculator is to output the first scaling rate equal to a reference scaling rate when the on-pixel ratio is less than the first reference on-pixel ratio.

7. The display device as claimed in claim 4, wherein:

the display panel includes a boundary region between the central region and the peripheral region, and the image converter is to reduce boundary image data corresponding to the boundary region based on the first scaling rate and the second scaling rate.

8. The display device as claimed in claim 7, wherein the image converter is to calculate a third scaling rate by interpolating the first scaling rate and the second scaling rate based on location information of a grayscale value in the boundary image data and is to reduce the grayscale value based on the third scaling rate.

9. The display device as claimed in claim 4, wherein the image converter calculates a fourth scaling rate by interpolating the first scaling rate and the second scaling rate based on location information of a grayscale value in the image data and reduces the grayscale value based on the fourth scaling rate.

10. The display device as claimed in claim 9, wherein the image converter is to:

calculate an additional scaling rate based on direction information of a grayscale value in the image data and reduce the grayscale value based on the fourth scaling rate and the additional scaling rate, and the direction information includes a direction in which a pixel corresponding to the grayscale value is located with a central axis of the display panel.

11. The display device as claimed in claim 9, wherein the timing controller includes an image processor to generate the image data by shifting an input image data from an external component in a first direction.

12. The display device as claimed in claim 11, wherein the image processor is to match a central axis of an image corresponding to the input image data to a central axis of the display panel.

* * * * *